Jan. 22, 1929.  1,699,742
R. P. LANSING
SHOCK ABSORBER FOR VEHICLES
Filed Jan. 6, 1925
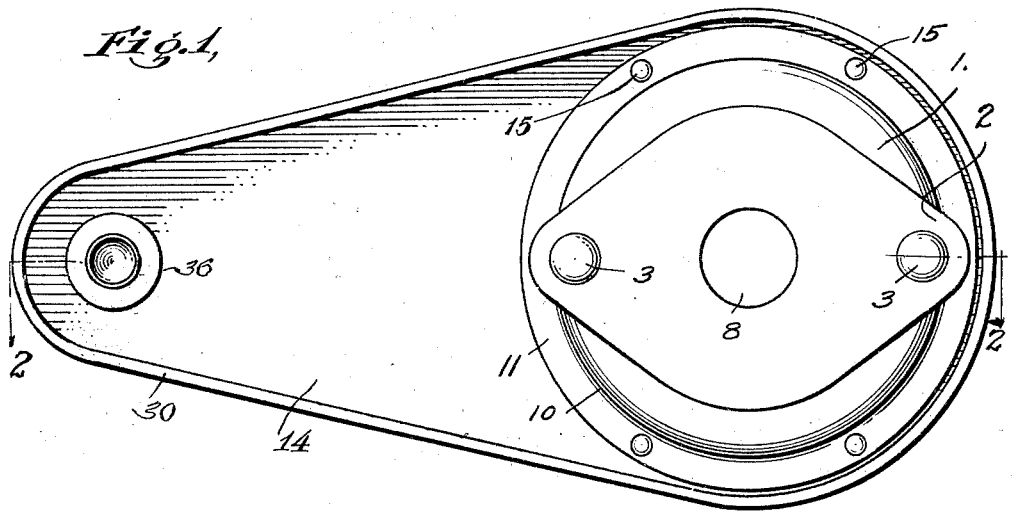
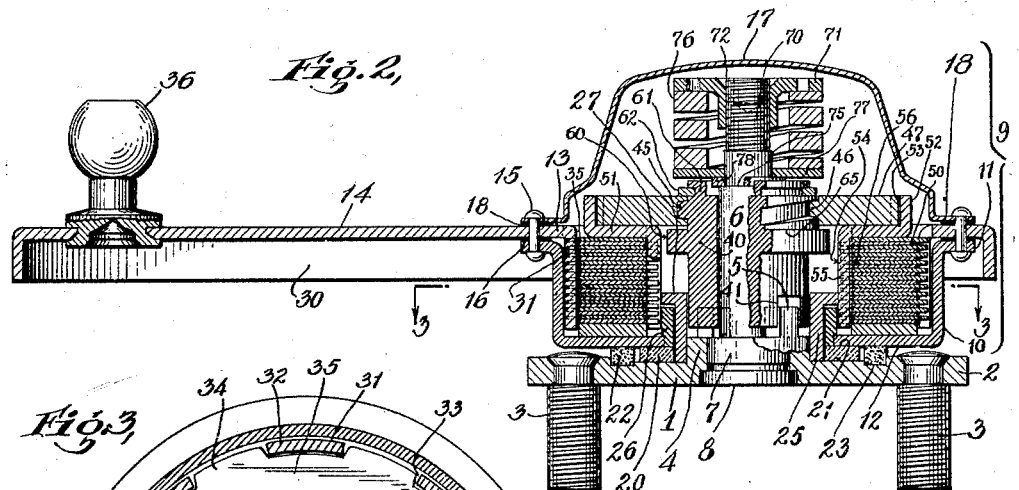
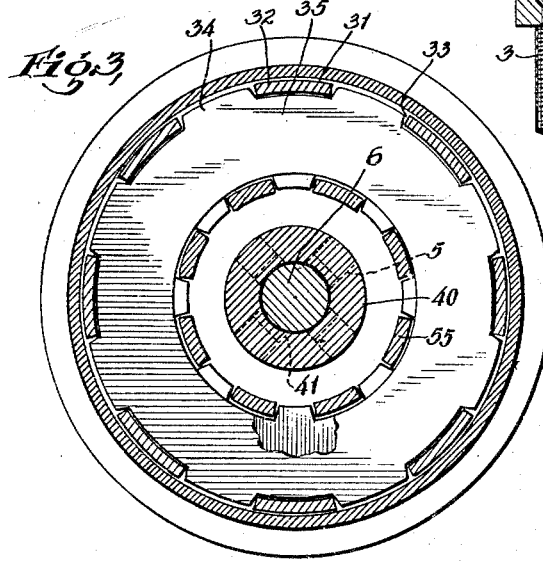
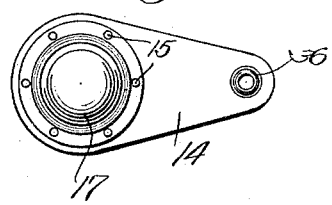
INVENTOR
Raymond P. Lansing
BY
Dempster M. Smith
ATTORNEY Patented Jan. 22, 1929.

1,699,742

UNITED STATES PATENT OFFICE.

RAYMOND P. LANSING, OF MONTCLAIR, NEW JERSEY.

SHOCK ABSORBER FOR VEHICLES.

Application filed January 6, 1925. Serial No. 752.

My invention relates to shock absorbers, or appliances for controlling the action of vehicle springs.

The general object of the invention is to provide an appliance of the friction type which is strong, durable and of simple construction, and therefore may be produced at a moderate cost.

A more particular object is to provide an appliance which includes relatively revoluble structures, a relatively large number of friction elements or surfaces operative between these structures in order to give a very substantial friction effect with a relatively moderate pressure applied to the surfaces, yieldable means or a spring, and inclined elements or screw threads co-operating with the yieldable means to produce or control the friction pressure, which preferably differs in the different directions of relative movement of the revoluble structures.

A further object is to so arrange or adapt the structure that a relatively large number of friction members or discs may be employed, and they and the structure in general may be of moderate diameter while providing the desired friction resistance with moderate pressure values.

A more particular object is to improve the action of shock absorbers of this type by avoiding or limiting excessive movement of certain of the movable elements in one direction, as sufficiently explained.

Another object is to provide an improved retaining structure or thrust bearing for securing relatively revoluble parts without considerable or noticeable lost motion.

Another object is to improve the mechanical structure or details of devices of this class in various ways, as explained below.

The present invention as represented by the specific embodiment here shown, is similar in certain general and specific features to other of my inventions disclosed in pending applications, and especially to the structure shown in my copending application Ser. No. 743,924, filed Oct. 16, 1924, with important modifications and improvements.

The characteristics and advantages of the invention are further sufficiently explained in connection with the following detail description of the accompanying drawing, which shows one exemplifying embodiment of the invention. After considering this embodiment, persons skilled in the art will understand that many variations may be made within the principles of the invention, and I contemplate the employment of any structures that are properly within the scope of the appended claims.

Fig. 1 is a rear elevation of a shock absorber embodying the invention in one form; that is a view looking at the side of the base plate 1 which is secured against the outer face of a vehicle side frame member.

Fig. 2 is a longitudinal, horizontal section of the same, in the plane 2—2, Fig. 1.

Fig. 3 is a transverse section.

Fig. 4 is a front elevation.

A main or base plate 1 is provided with ears 2 for attachment to a part of a motor vehicle such as a chassis frame member, by screws or bolts 3 or like means, or in some cases the base may have an articulated connection to the frame, as well understood in this art. The base has a short extension or sleeve 4 terminating in teeth or jaws 5. A shaft or spindle 6 has an enlargement 7 closely fitting in sleeve 4. The engaging faces of the enlargement 7 and the sleeve may be serrated to prevent relative rotation, although there is no considerable force tending to cause spindle rotation. At the inner end the spindle has a head 8 fitting in a counterbore in the base plate.

A revoluble structure, designated as a whole by reference numeral 9, is arranged for rotation or oscillation about the spindle. This structure includes an inner member 10 which may be described for identification and without necessary limiting significance as an inner housing or cover member, which is usually of pressed sheet metal and includes the cylindrical portion to which the numeral 10 is directly applied, an outer flange 11, and an inner flange 12. The central or hub portion 13 of a lever or arm 14 is secured to flange 11 by a convenient means, such as rivets 15, or screws if it is desired to readily separate the parts. Usually a gasket 16 is placed between the hub and flange. An outer cover 17 is secured to the outer face of hub 13, usually by means of the rivets 15, and with an interposed gasket 18.

A flat ring 20 is located on the outer face of plate 1 and centered at the axis of spindle 6, and a portion 21 of flange 12 of the inner rotor member 10 constitutes a bearing plate or surface bearing upon a portion of the outer face of ring 20. This ring is free to turn in relation to the outer face of base plate 1, and has an appreciable friction value, but usually serves mainly as a thrust bearing with moderate or negligible friction effect and for that purpose is preferably made of some such material as bronze, which provides a good bearing with a low friction coefficient, when in contact with steel, and the friction effect is further reduced by the small average radius of the ring. A packing consisting of a ring 22 of felt or other suitable compressible material is usually placed about ring 20, and is located or centered about the spindle by a channel 23 in the base plate. This packing aids in retaining grease or other lubricant and also excludes dirt and moisture from the bearing surfaces of ring 20.

A cylindrical thimble 25 engages the outer face of sleeve 4 with a tight or press fit, and its inner end portion serves to properly center ring 20, which, however, is preferably permitted to rotate in relation to base plate 1 by slight clearance around the thimble, in order to permit wear to occur both on the inner and outer ring faces, and so to increase its life. A short cylindrical spacing sleeve 26 is located with a bearing fit about the cylindrical portion of thimble 26 and is restrained from outward movement by a flange 27 on the thimble. The inner end of the spacer rests on a portion of the outer surface of ring 20 with a bearing fit or clearance. At its inward end the outer surface of spacer 26 is of slightly reduced diameter to engage within the circular aperture in plate 12 with a tight or press fit, to substantially lock these parts together and prevent relative rotation or axial movement.

The parts just described constitute a retaining and bearing structure or arrangement for the entire rotor structure 9. Lever 14 secured to the inner rotor member 10, outer cover 17 and other parts later referred to, oscillate as a unit about the fixed thimble 25, the inner surface of spacer 26 acting as a radial bearing for this movement. Any thrust effect or material axial play is also taken up by the spacer 26 and plate 12 co-operating with ring 20, and by the spacer 26 co-operating with flange 27 of thimble 25. There is therefore no objectionable or perceptible play of the rotor structure. In assembling the parts the spacer 26 is usually first pressed into position within the aperture of plate 12, and after the plate with certain other parts is put in position about the spindle and before other parts later referred to are positioned, thimble 25 is pressed into position and thereafter the described parts of the rotor structure with other parts which are later positioned, is retained for rotation and against end movement in the described manner.

The lever arm 14 may desirably be of pressed sheet metal and in such cases is desirably formed with an outer flange 30 extending about the entire outline of the lever, including its hub 13, to provide sufficient strength and rigidity. Desirably also, the central portion of the hub is drawn or pressed to provide an inwardly projecting cylindrical flange 31, which is channeled or completely slotted to provide spaced jaws 32 with intermediate channels or slots 33 constituting splineways to receive spaced teeth or splines 34 formed on the outer peripheries of a suitable plurality of friction plates or discs 35, conveniently identified as rotor discs, since they are secured in the described manner to move with the rotor structure, while permitted suitable axial movement. The spline or jaw structure 31 is evidently not necessarily integral with the lever 14.

At the outward end of the lever is a ball or other suitable fitting 36 for the connection of the lever to a part of a vehicle such as the axle, by a suitable link, or in any known or suitable manner.

A device conveniently identified as a shifter 40 is located on spindle 6 with a bearing fit to provide for axial movement. At its inner end the shifter has spaced jaws 41 co-operating with sleeve jaws 5 to prevent shifter rotation while permitting axial movement. The longitudinal dimensions of the jaws 5 and 41 are such that when the shifter is properly positioned by co-operation with other parts as later explained, there is very substantial clearance longitudinally between the outer ends of the sleeve jaws 5 and the confronting ends of the shifter, and between the inner ends of the shifter jaws 41 and the confronting end of the sleeve. These clearances are provided to prevent any contact or seating of the shifter against the sleeve in its inward movement. The inward portion of the shifter including its jaws, has a substantial clearance from thimble 25.

A suitable plurality of screw threads 45 are formed on the outer end of the shifter, and these co-operate with threads 46 formed in the bore of a nut or plate 47, which may otherwise in some cases be conveniently designated a pressure member, since one of its important functions is to convey pressure from the shifter to the friction discs. The plate or pressure member is provided with means for properly connecting to it friction discs 50 which are interspaced with the rotor discs 35. For manufacturing convenience and economy such means preferably consists of a separate pressed or drawn metal fitting 51, which has an outer cylindrical flange 52, channeled or slotted to provide jaws engaging splines or jaws 53 on the periphery of plate 47, so as to prevent relative rotation of the plate and fitting 51. The fitting also has an inner cylindrical flange or sleeve 54 which is channeled or slotted to provide jaws 55 to co-operate with teeth or splines 56 formed in the apertures of discs 50, and so to connect the discs irrevolubly to the pressure member and permit proper end motion. The inner portion of the bore of sleeve 54 or of the jaws 55 has a bearing fit about spacer 26 and the periphery of flange 27.

At the inward end of the threaded portion of the shifter, the latter is provided with a flange 60. At the outer end of the threaded portion an annular groove 61 is cut in the shifter to receive a ring 62, which may be a split or snap ring, and which projects sufficiently to overlap the inward portion of plate 47 or its threads. Ring 62 and flange 60 are so located as to properly establish the limits of longitudinal movement of pressure plate 47 and its connected parts in both directions in relation to the shifter, or to limit outward movement of the shifter in certain cases, and also flange 60 limits the rotary movement of the pressure member and its associated parts in one direction of movement. When the pressure member 47 is in its outer position, as shown in Fig. 2, there is a substantial clearance at 65 between the flange and the inner face of the pressure plate, and this clearance indicates the total relative travel of the pressure member and shifter.

The outward end of spindle 6 is of reduced diameter and is provided with a screw thread 70 to receive an adjustable spring abutment or nut 71 which may have any suitable locking device 72. A shoulder 75 is formed on the spindle and yieldable pressure means, specifically a helical spring 76, is pressed between this shoulder and abutment 72, washers 77 and 78 being provided, preferably, to properly locate the inward end of the spring and provide proper clearance for shifter travel.

The appliance is designed to oppose greater resistance to vehicle spring movement in one direction than in the other, and it is usually preferred to oppose the greatest resistance to vehicle spring recoil. It will therefore be assumed in the following operative description that the appliance is properly arranged on the vehicle to act in the manner stated, but skilled persons will easily understand that it may readily be adapted to oppose the greatest resistance to vehicle spring compression by proper rearrangement or relocation; and the functional description will then be equally pertinent when suitable changes are made in words indicating position or direction of movement.

When the screw threads 45 and 46 have a right hand lead as shown, the end of lever 14 moves clockwise (Fig. 1) when the vehicle axle approaches the frame during vehicle spring compression, and counterclockwise during vehicle spring recoil. Fig. 2 shows the parts as they are positioned at the end of a recoil movement. Any considerable recoil is followed by an axle reaction or vehicle spring compression. Assuming this to be a small movement, the rotary structure including the lever, inner housing 10, and the rotor plates 35, rotate slightly about the spindle and by frictional contact of the discs the co-operating discs 50, fitting 54 and the pressure plate 47 turn simultaneously. As soon as screw thread clearance is taken up, the rotation of plate 47 effective through the screw threads, causes the shifter 40 to move outward. There is a slight normal clearance between the outer end of the shifter and washer 77. When the vehicle is running over comparatively smooth roads the stated movement, due to the slight spring jiggle caused by minor irregularities, is so small that the total clearance, including thread clearance and the shifter clearance just mentioned will not be fully taken up.

Spring 76 is normally compressed between the abutment 71 and spindle shoulder 75, or in other words, the spring is seated and inactive. There is therefore no appreciable resistance to the stated slight axle movement, the entire rotary structure turning on it bearing about the spindle. Vehicle spring recoil movements under similar conditions are also so small that the rotor movement is within the free range just described. There is therefore no interference with the normal resiliency of the vehicle springs while running over smooth roads.

When the vehicle axle moves any considerable distance away from the frame during a spring recoil, the clearance between the outer end of the shifter and washer 77 is taken up in the first small part of the rotor movement. As the movement continues the inward end of the spring is lifted from its seat against shoulder 75 and the full normal pressure of the spring is immediately applied through the shifter to the pressure member 47 and so to the friction discs and through them to the inner housing 10, urging its bearing surface 21 in engagement with bearing ring 20. There is a slight frictional resistance to that early part of the vehicle spring recoil movement which may be called for convenience the wind-up period, during which spring 76 is additionally compressed. The friction value at the point of contact between the rotor and ring 20 or between ring 20 and plate 1 if the ring turns, is, however, preferably small for reasons above stated and this effect may in most cases be considered negligible. Resistance is, however, during this period afforded to the arm movement by the work required to compress the spring. These conditions continue during the short travel of arm 14 necessary to bring the shifter flange 60 in contact with plate 47. Further rotation of the plate or pressure member and its connected parts is then prevented by engagement with the irrevoluble shifter and slippage immediately begins between all of the friction disc surfaces, with a pressure on each surface equal to the spring pressure transferred to the shifter and pressure member 47. This friction resistance during the remainder of the spring recoil may be made of a suitable, substantial value, with moderate spring pressure and a reasonable or small average diameter of the friction discs, by providing a considerable number of discs, the approximate number of discs used in actual practice in one form of the device being sufficiently indicated in the drawing. An important feature of the invention is the design or arrangement of other parts so that this very substantial number of discs can be employed while the size of the appliance is kept within desirable limits.

At the end of recoil movement any small or large vehicle spring compression, which usually immediately follows, will cause arm 14 to move clockwise, (as viewed in Fig. 1) and during this movement there is usually very little or practically no resistance and in some cases the arm movement is actually facilitated by the action of spring 76 which when the screw threads are of a suitably steep pitch acts through the nut and screw threads to rotate plate 47 in the same direction that the lever arm 14 is moving. After a very small angle of arm movement spring 76 seats on the spindle shoulder and its thrust is again self-contained and ineffective in the operation of the device. If the stated arm movement continues beyond this point, during a small additional angle of such movement, shifter 40 moves farther inward without any substantial effect upon other parts. Beginning at the instant when spring 76 seated on the spindle shoulder, the friction discs are free from any spring pressure and are free to slip relatively, and the resistance to arm movement to the end of any vehicle spring compression stroke is therefore only that due to the slight drag of the friction discs and their lubricant. There is, however, a very substantial tendency to free the plates from actual contact with each other, due to the movement of the jaws 55 along with plate 47, this movement tending to drag the set of discs which engage these jaws outward, while the other set of rotor plates tend to remain in fixed position by their engagement with the jaws 31.

It is desirable to prevent the shifter from moving inward more than a moderate amount, because if it is permitted to move far in, its outer end will become widely separated from the inner end of spring 76 or washer 77, and then the outward travel would have to be correspondingly great during the next vehicle spring recoil before spring 76 became effective to apply resistance to such movement. It is mainly for this purpose that means such as ring 62 is employed, to limit the inward movement of the shifter in a manner which is obvious in Fig. 2 and as there shown, this inward shifter movement is stopped when there is only a very moderate clearance between its outer end and washer 77, and therefore spring 76 will be effective in the next vehicle spring recoil movement after arm 14 moves through a very small substantially free angle, as above sufficiently explained.

The housing constituting the principal portion of the appliance is made water and oil tight and a substantial amount of lubricant is preferably introduced in the housing to lubricate the screw threads, the shifter where it slides on the spindle, and the friction discs; and the design is such that a sufficient number of discs may be used in compact space to provide the desired friction resistance even when thoroughly lubricated, and when the spring pressure is reasonably low. It is also desirable in many cases to use a fairly heavy or viscous lubricant, such as heavy oil or grease of a suitable grade, and to introduce a sufficient amount of this lubricant into the casing to act also as a cushioning agency between certain moving parts and especially between the shifter and washer 77, for the purpose of preventing the more or less noticeable noises, which are caused in some cases by shifter movement in the absence of any such cushioning agent.

The combined thrust and radial bearing for the rotor structure is so designed that the relatively movable surfaces have an approximately close fit and these surfaces are moreover so arranged that any substance passing between them will have to pursue a substantially long and circuitous course. Any slight amount of lubricant which finally reaches the periphery of ring 20 will be then retained by the compressible gasket 22.

I claim:—

1. An appliance of the character described, comprising a member arranged for connection to a vehicle part such as the frame or axle, a rotor structure arranged for relative oscillation and including a lever arm and parts forming a casing, friction means, yieldable pressure means and inclined operating means within the casing, and a thrust bearing to prevent substantial axial movement of the rotor structure.

2. An appliance of the character described, comprising a member arranged for connection to a vehicle part such as the frame or axle, a rotor structure arranged for relative oscillation and including a lever arm and parts forming a casing, friction means, yieldable pressure means and inclined operating means within the casing, and a combined radial and thrust bearing including a part secured to said member and a co-operating part secured to the rotor structure and serving to guide the rotor structure in its oscillation and substantially prevent axial movement.

3. An appliance of the character described, comprising a member arranged for connection to a vehicle part such as the frame or axle, a rotor structure arranged for relative oscillation and including a lever arm and parts forming a casing, friction means within the casing, said friction means including friction members, yieldiable pressure means, and relatively fixed and movable inclined members controlling the application of the pressure of said yieldable means to the friction members, and a thrust bearing preventing substantial axial movement of the rotor structure.

4. A shock absorber or similar device comprising a base adapted for connection to a vehicle part, a spindle extending therefrom, a shifter movable axially on the spindle, means preventing shifter rotation and arranged to avoid interference with inward shifter movement, a pressure member having an inclined member co-operating with the shifter, means for limiting inward movement of the shifter in relation to the pressure member, a spring, means normally maintaining the spring in inactive condition, at least one friction member connected irrevolubly to the pressure member, a rotor structure including parts forming a casing surrounding and enclosing the spindle, shifter, pressure member and spring, and at least one friction member connected irrevolubly to the rotor structure.

5. A shock absorber or similar device comprising a base adapted for connection to a vehicle part, a spindle extending therefrom, a shifter movable axially on the spindle, means preventing shifter rotation and arranged to avoid interference with inward shifter movement, a pressure member having an inclined member co-operating with the shifter, means for limiting inward movement of the shifter in relation to the pressure member, a spring, means normally maintaining the spring in inactive condition, at least one friction member connected irrevolubly to the pressure member, a rotor structure including parts forming a casing surrounding and enclosing the spindle, shifter, pressure member and spring, and at least one friction member connected irrevolubly to the rotor structure, and a thrust bearing on the base co-operating with an outer surface of the rotor structure.

6. A shock absorber or similar device comprising a base adapted for connection to a vehicle part, a spindle extending therefrom, a shifter movable axially on the spindle, means preventing shifter rotation and arranged to avoid interference with inward shifter movement, a pressure member having an inclined member co-operating with the shifter, means for limiting inward movement of the shifter in relation to the pressure member, a spring, means normally maintaining the spring in inactive condition, at least one friction member connected irrevolubly to the pressure member, a rotor structure including parts forming a casing surrounding and enclosing the spindle, shifter, pressure member and spring, at least one friction member connected irrevolubly to the rotor structure, and a combined rotary and thrust bearing for the rotor structure including an element fixed to the rotor structure and an element fixed to the base.

7. A shock absorber or similar device comprising a base adapted for connection to a vehicle part, a spindle extending therefrom, a shifter movable axially on the spindle, means preventing shifter rotation and arranged to avoid interference with inward shifter movement, a pressure member having an inclined member co-operating with the shifter, means for limiting inward movement of the shifter in relation to the pressure member, a spring, means normally maintaining the spring in inactive condition, at least one friction member connected irrevolubly to the pressure member, a rotor structure including parts forming a casing surrounding and enclosing the spindle, shifter, pressure member and spring, at least one friction member connected irrevolubly to the rotor structure, the casing being substantially greased tight, and the rotary and thrust bearing being arranged to provide a long and approximately tight leakage path and thus to substantially prevent escape of lubricant.

8. A shock absorber or similar device comprising a base adapted for connection to a vehicle part, a spindle extending therefrom, a shifter movable axially on the spindle, jaws on the base and shifter preventing shifter rotation and dimensioned to avoid interference with inward shifter movement, a pressure member having screw thread engagement with the shifter, means acting between the pressure member and shifter to limit its movement with relation to the pressure member in both directions, a spring, means normally maintaining the spring in inactive condition with one end arranged for shifter contact to exert spring pressure through the shifter to the pressure member, a plurality of friction discs connected irrevolubly to the pressure member, a rotor structure including parts forming a casing surrounding and enclosing the spindle, shifter, pressure member and spring, and a plurality of friction discs interfitting with those above mentioned and connected irrevolubly to the rotor structure.

9. A shock absorber or similar device comprising a base adapted for connection to a vehicle part, a spindle extending therefrom, a shifter movable axially on the spindle, jaws on the base and shifter preventing shifter rotation and dimensioned to avoid interference with inward shifter movement, means acting between the pressure member and shifter to limit its movement with relation to the pressure member in both directions, a spring, means normally maintaining the spring in inactive condition with one end arranged for shifter contact to exert spring pressure through the shifter to the pressure member, a plurality of friction discs connected irrevolubly to the pressure member, a rotor structure including parts forming a casing surrounding and enclosing the spindle, shifter, pressure member and spring, a plurality of friction discs interfitting with those above mentioned and connected irrevolubly to the rotor structure, and a thrust bearing member on the base co-operating with an outer surface of the rotor structure.

10. A shock absorber or similar device comprising a base adapted for connection to a vehicle part, a spindle extending therefrom, a shifter movable axially on the spindle, jaws on the base and shifter preventing shifter rotation and dimensioned to avoid interference with inward shifter movement, a pressure member having screw thread engagement with the shifter, means acting between the pressure member and shifter to limit its movement with relation to the pressure member in both directions, a spring, means normally maintaining the spring in inactive condition with one end arranged for shifter contact to exert spring pressure through the shifter to the pressure member, a plurality of friction discs connected irrevolubly to the pressure member, a rotor structure including parts forming a casing surrounding and enclosing the spindle, shifter, pressure member and spring, a plurality of friction discs interfitting with those above mentioned and connected irrevolubly to the rotor structure, and a combined rotary and thrust bearing for the rotor structure including an element fixed to the rotor structure and an element fixed to the base.

11. A shock absorber or similar device comprising a base adapted for connection to a vehicle part, a spindle extending therefrom, a shifter movable axially on the spindle, jaws on the base and shifter preventing shifter rotation and dimensioned to avoid interference with inward shifter movement, a pressure member having screw thread engagement with the shifter, means acting between the pressure member and shifter to limit its movement with relation to the pressure member in both directions, a spring, means normally maintaining the spring in inactive condition with one end arranged for shifter cotact to exert spring pressure through the shifter to the pressure member, a plurality of friction discs connected irrevolubly to the pressure member, a rotor structure including parts forming a casing surrounding and enclosing the spindle, shifter, pressure member and spring, a plurality of friction discs, interfitting with those above mentioned and connected irrevolubly to the rotor structure, a combined rotary and thrust bearing for the rotor structure including an element fixed to the rotor structure and an element fixed to the base, the casing being substantially grease tight, and the rotary and thrust bearing being arranged to provide a long and approximately tight leakage path and thus to substantially prevent escape of lubricant.

12. An appliance of the class described comprising a member adapted for connection to a vehicle part such as a frame member, another relatively revoluble member adapted for connection to another vehicle part such as an axle, friction means intermediate the members, a spring, an axially movable actuator, a pressure plate, means by which rotary movement of the pressure plate moves the actuator axially, and means for limiting movement of the actuator in one direction.

13. An appliance of the class described comprising a member adapted for connection to a vehicle part such as a frame member, another relatively revoluble member adapted for connection to another vehicle part such as an axle, friction means intermediate the members, a spring, an axially movable actuator, a pressure plate and means by which rotary movement of the pressure plate moves the actuator axially, the spring being arranged to apply friction pressure to said friction means when the actuator is moved in one direction, and a stop acting between the actuator and the pressure plate to prevent excessive movement of the actuator in the other direction.

Signed at New York in the county of New York and State of New York this 5th day of January, A. D. 1925.

RAYMOND P. LANSING.